UNITED STATES PATENT OFFICE.

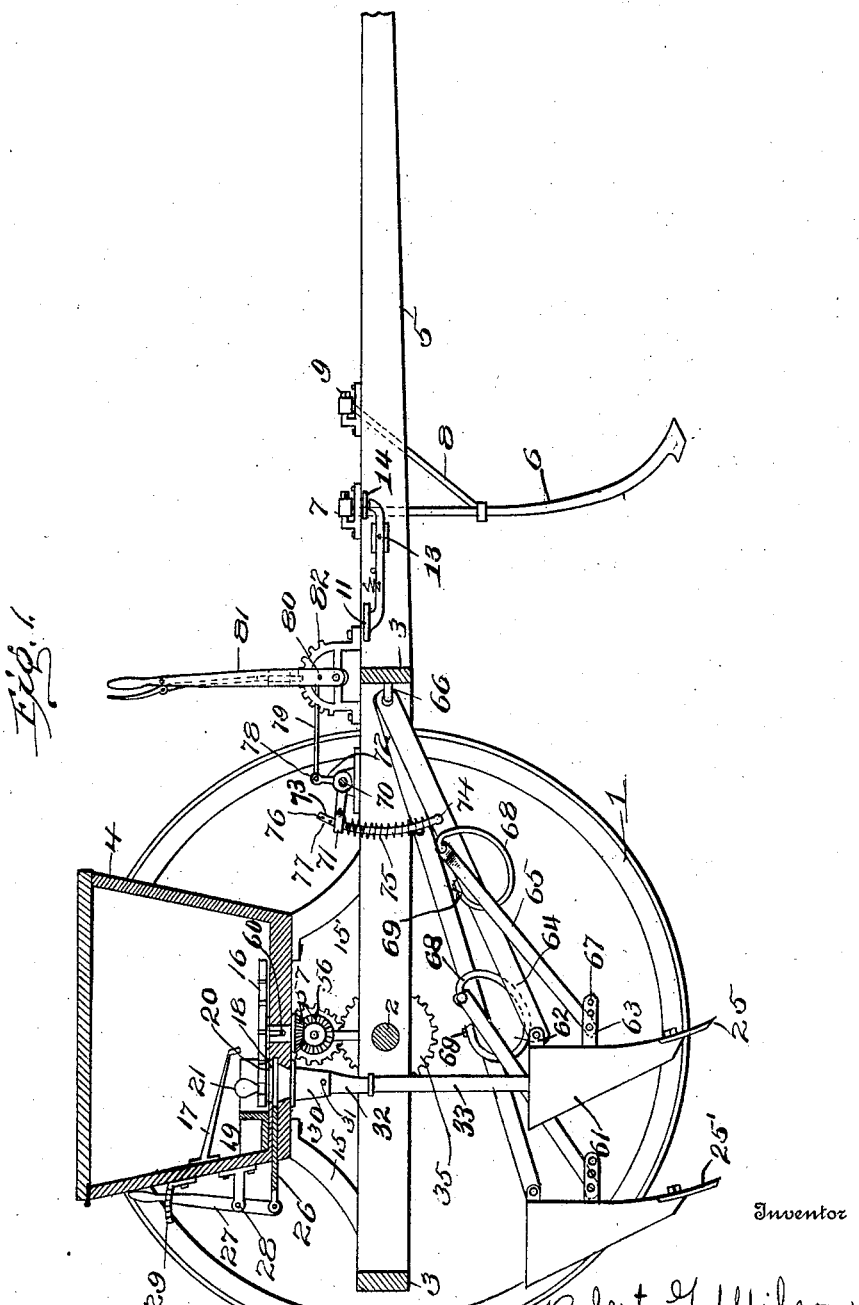

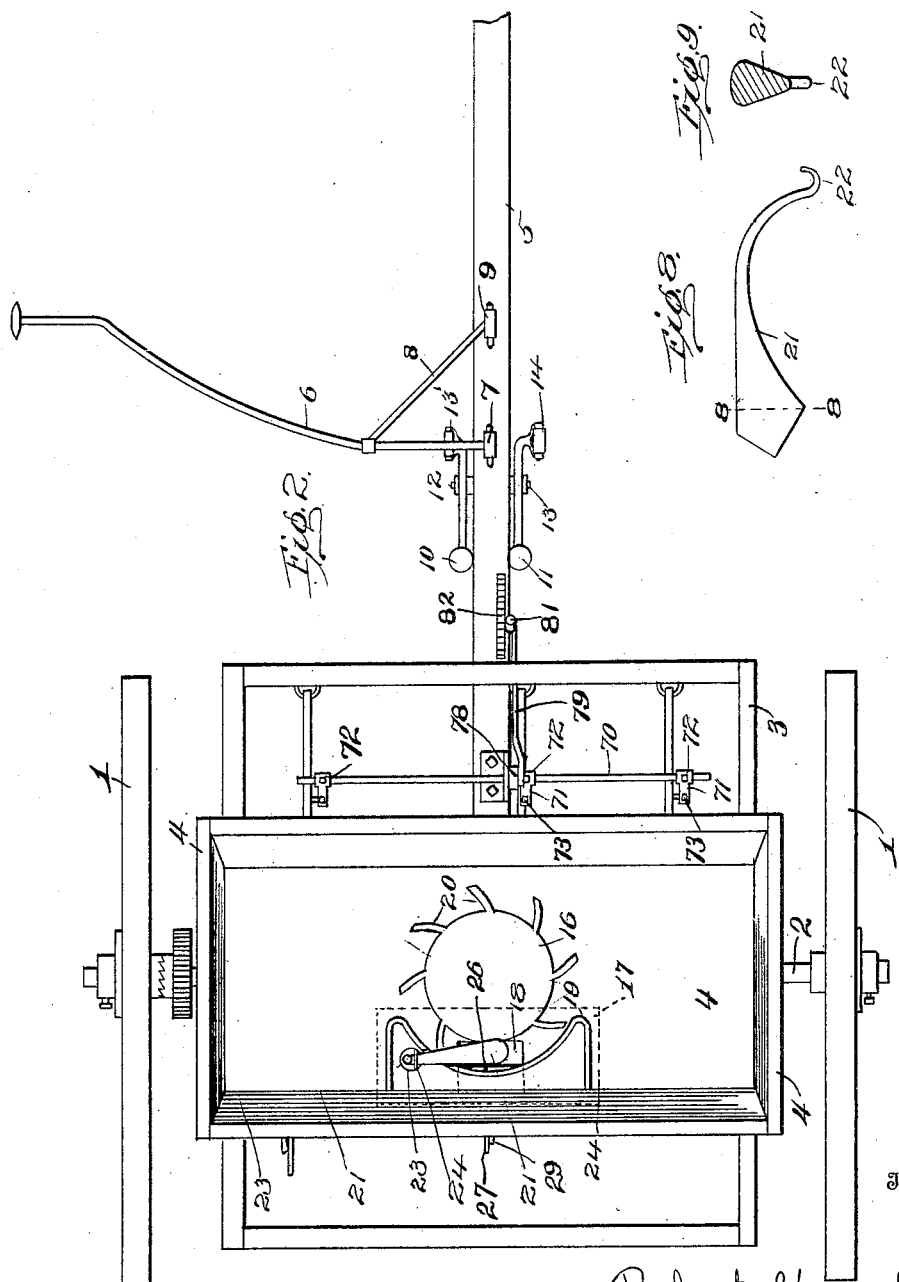

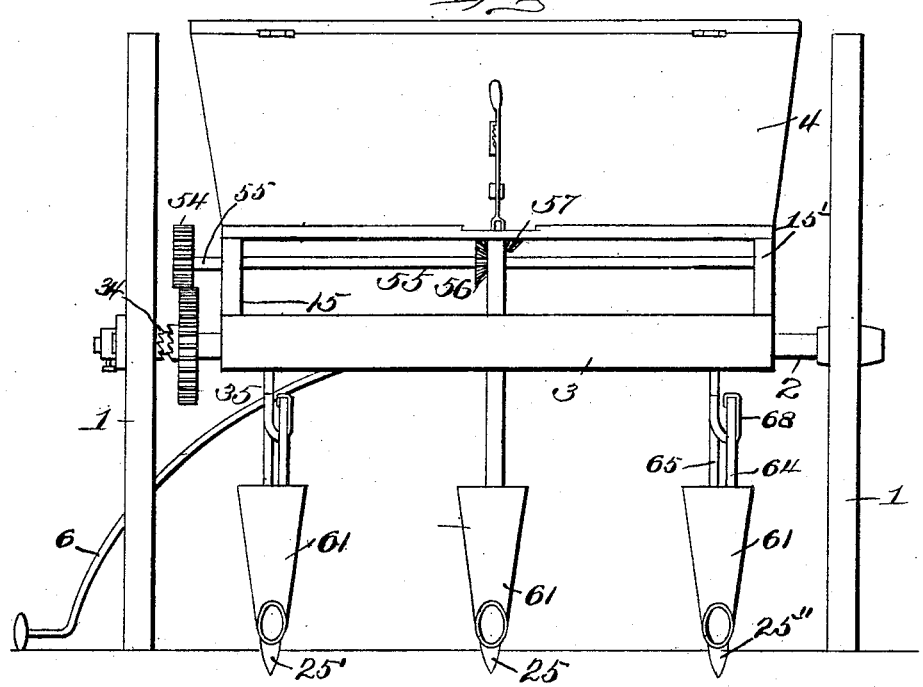
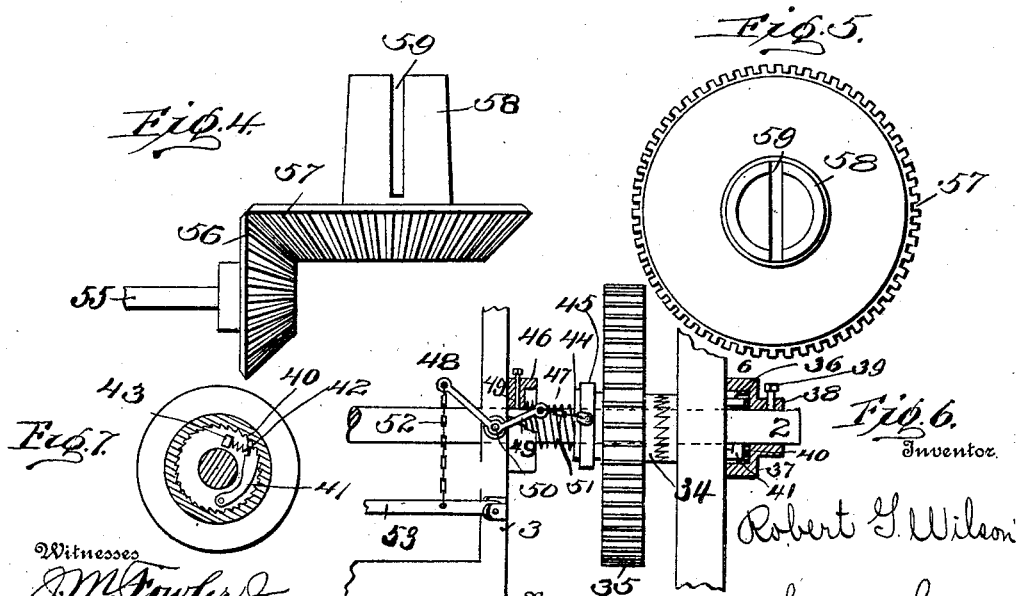

ROBERT G. WILSON, OF MADISON, NORTH CAROLINA.

LISTER AND FERTILIZER-DISTRIBUTER.

No. 902,516.

Specification of Letters Patent.

Patented Oct. 27, 1908.

Application filed April 9, 1907. Serial No. 367,230.

*To all whom it may concern:*

Be it known that I, ROBERT G. WILSON, a citizen of the United States, residing at Madison, in the county of Rockingham and State of North Carolina, have invented certain new and useful Improvements in Listers and Fertilizer-Distributers; and I do hereby declare the following to be a full, clear, and exact description of the invention, such as will enable others skilled in the art to which it appertains to make and use the same.

This invention relates to improvements in fertilizer distributers, and comprises certain novel constructions combinations and arrangements of parts as will be hereinafter more fully described and claimed, and has for an object the evenly distributing of fertilizer in predetermined quantities.

In the accompanying drawings:—Figure 1 represents a vertical longitudinal section through a fertilizer distributer constructed according to the present invention. Fig. 2 is a top plan view of a fertilizer distributer formed according to the present invention, certain parts being removed for better disclosing the mechanism thereof. Fig. 3 is a rear elevation of a fertilizer distributer formed according to the present invention. Fig. 4 is a view of a pair of beveled gears used in connection with the feeding device of the present invention. Fig. 5 is a top plan view of one of the gears shown in Fig. 4. Fig. 6 is a detail, fragmentary, top plan view of a clutch and surrounding mechanism forming a part of the present invention, certain parts being broken away to better disclose the mechanism thereof. Fig. 7 is a section taken on line 6—6 of Fig. 6. Fig. 8 is a side elevation of a pivotally mounted member or "knocker" used in forcing the fertilizer from the feeding wheel, and Fig. 9 is a section on line 8—8 of Fig. 8.

In constructing a fertilizer distributer according to the present invention, I provide suitable wheels as 1, which are mounted upon a shaft or axle 2. A suitable frame 3 is provided for mounting a fertilizer carrying hopper 4 thereupon, together with the remaining mechanism of the present invention. A suitable tongue 5 is provided upon which is mounted a marker 6. As will be clearly seen in Figs. 1 and 2, marker 6 is pivotally mounted at 7, and has a bracing member 8 mounted at 9 for holding the same in proper position. The bracing member 8 and the marker 6 is pivoted at 9 and 7 respectively so that when desired the marker 6 may be rotated or moved over the tongue so as to mark on either side thereof as may be desired. In order to easily move the marker from one side to the other, I provide a pair of foot-levers 10 and 11 mounted upon each side of the tongue 5. Foot-levers 10 and 11 are pivotally mounted at 12 and 13 so that when the rear end is depressed the forward end will be raised and will consequently raise the marker 6 to a substantially vertical position. By a quick movement of levers 10 or 11 the marker 6 is raised to an almost vertical position and the momentum thereof will carry the same past the center of tongue 5 and permit the marker to drop to the ground on the opposite side.

Suitable anti-friction means as rollers 13' and 14 are provided upon the forward ends of levers 10 and 11 for more easily moving upon marker 6. From this it will be seen that when the distributer has reached the end of the field and is turned around for again crossing the field, one of the levers 10 or 11 is depressed and the marker is thrown over to the opposite side without necessitating the driver leaving his position on the distributer. Upon the framework 3 is mounted a fertilizer receiving hopper 4 which is held in position by suitable supports or legs 15 and 15'. Journaled in the bottom of the hopper 4 are any desired number of fertilizer feeding wheels 16. The distributing or feeding wheels 16 may be of any number and positioned at any desired place in the bottom of hopper 4, but I preferably place the same approximately centrally thereof, and provide a covering or fender 17 for each wheel 16, or if desired the fender 17 may extend the full length of the hopper. The fender 17 is designed to prevent any fertilizer from reaching aperture 18 formed in the bottom of hopper 4, except that which is forced there by the arms of wheel 16. A guiding member or fender 19 is positioned beneath member 17, and is designed to almost contact with the teeth 20 of wheels 16 so as to prevent any large pieces of fertilizer from being forced over discharge aperture 18. A loosely pivoted member or knocker 21 is provided for forcing the fertilizer into the hole or aperture 18 after the same has been brought above the aperture by teeth 20. The rear end of the knocker 21 is provided with a hook 22, that is inserted into an aperture 23 and is held in place by pin 24. The aperture 23 and pin 24 may be positioned in the bottom of the hopper 4 or provided in a sheet of metal or other material that is secured to the shield or guide 19. The feed wheel 16 is designed when rotated at a sufficient speed to feed a certain amount of fertilizer to the shovel 25, but in order to evenly regulate the amount distributed, I provide a slide 26 which is designed to slide beneath the aperture or hole 18 and when forced to its inner position will entirely cover aperture 18. A suitable lever 27 is pivotally mounted at 28 for moving slide 26 to any desired degree. A suitable sector 29 is provided for regulating the amount of movement of slide 26. Any desired numbers may be placed upon sector 29 so that when lever 27 is brought opposite any particular point the operator may see exactly how much fertilizer is being distributed to the acre. In case the slide 26 is in its inner position or is almost to that position, fertilizer that is brought above the hole or aperture 18 cannot all be forced therethrough by the knocker 21. What is not forced through aperture 18 is, of course, simply moved out from beneath shield 17 into the main part of the hopper, and is either left there or again brought beneath knocker 21 together with an additional supply. Rigidly secured to the bottom of the hopper are any desired number of chutes 30 corresponding in number to wheels 16, there being only one shown in the present instance. Each chute 30 has pivotally secured thereto at 31 a secondary chute 32, which has secured thereto in any convenient way a tube 33 which is designed to guide fertilizer from aperture 18 to the earth through shovel or furrow opener 25. Positioned at the rear and on each side of furrow opener 25 are shovels or plows 25′ and 25″ which are designed to list or throw the earth toward the opener 25 in order to thoroughly cover the fertilizer that is fed into the furrow made by furrow opener 25.

One of the wheels 1 has secured to the hub thereof one face of a clutch 34. The other face of the clutch 34 is rigidly secured to gear wheel 35. Frame 3, gear wheel 35, and wheel 1 are mounted loosely upon shaft 2, wheel 1 being provided with threaded extension 36, as clearly seen in Fig. 6 upon which extension is threaded a sleeve or cap 37. Sleeve 37 is formed with an extension 38 through which is passed securing means as set screws 39, which when forced downward will rigidly connect shaft 2 and sleeve 38. Sleeve or cap 37 is provided with a series of teeth 40 which are designed to be engaged by a pawl 41 that is normally pressed outward by a spring 42 that acts against the lug 43 formed integral with or rigidly secured to the hub of wheel 1. Pawl 41 is pivotally mounted on the hub of wheel 1 and is forced outward by a spring 42 and into engagement with teeth 40. By this arrangement wheel 1 is connected to shaft 2 so that whenever the same revolves, shaft 2 will also revolve. By this arrangement both wheels propel shaft 2 and consequently transmit power to gear wheel 35, which would not be the case if gear wheel 35 was simply attached to one of the wheels 1, and the same was not secured to axle or shaft 2. The hub of gear wheel 35 is provided at one end with a flange 44 which is adapted to prevent a ring 45 that is mounted thereon from slipping off the end of the hub. Ring 45 is loosely mounted upon the hub so as to permit the hub to revolve but not necessitate the revolving of the ring. Surrounding the axle or shaft 2 is a cup-shaped stop 46 that is rigidly secured to axle 2 and is designed to accommodate a spring 47 which impinges against the hub of gear wheel 35 for normally forcing the same outward for causing clutch 34 to engage. When gear wheel 35 is moved upon axle 2 so as to disengage clutch 34 the hollowed out portion of stop 46 will accommodate spring 47. The stop 46 is rigidly secured to the axle 2 for providing a revolving rest or stop for spring 47 as well as the revolving hub against which the same impinges. This is so arranged as to prevent slipping of the spring and considerable friction thereby during the operation of the machine. Pivotally mounted upon frame 3 are levers 48 and 49 which are rigidly secured together at pivot point 50 so that when either lever is acted upon the other will be correspondingly moved. The outer end of lever 49 has a chain or other connecting means 51 secured thereto which extends over and is secured to sleeve 45 so that when lever 49 is moved sleeve 45 will be moved and consequently gear wheel 35 will also be moved or reciprocated. A chain or other connecting means 52 is secured to the outer end of lever 48 and to a bar or lever 53 that is adapted to be forced outward or to the rear of the hopper and consequently move the outer end of lever 48 rearward, which in turn will move the outer end of lever 49 toward the center of the distributer. The moving of the outer end 49 toward the center of the distributer, will, as will be evident, move gear wheel 35 toward the center of the distributer and consequently unclutch clutch 34, power being transmitted through chain or other connecting device 51. From this it will be seen that whenever lever 53 is moved outward, that is to the rear of hopper 4, clutch 34 will be moved so as to be disengaged, which will consequently disconnect the fertilizer feeding mechanism from the wheel 1.

In moving the distributer from place to place the clutch 34 is disengaged, and when it is desired to use the distributer, lever 48 is moved inward, that is toward the hopper 4 and spring 47 is permitted to force gear wheel 35 outward so as to permit clutch 34 to be engaged. When gear wheel 35 is connected to wheel 1 through the engagement of clutch 34, the same will rotate as the distributer is moved across the field and will consequently rotate a gear 54 which is mounted upon a shaft 55 that is designed to extend the full width of the lister or distributer frame and is positioned below the hopper 4, preferably centrally thereof. Secured to shaft 55 is a gear 56 which is designed to mesh with gear 57. Gear 57 is provided with a bearing or hub 58 which has formed therein a slot 59 which when assembled will accommodate a pin 60 that projects through the hub of the feed wheel 16. From this it will be seen that when gear wheel 35 is rotated the same will rotate gear 54 which in turn will rotate shaft 55. Shaft 55 is designed to rotate gear 56 which meshes with gear 57, which in turn is connected by pin 60 to feed wheel 16. By this it will be seen that whenever gear wheel 35 is rotated, feed wheel 16 is rotated for forcing fertilizer beneath the hammer or knocker 21.

When fertilizer is forced through aperture 18, and is permitted to drop down through boot or shoe 61, the same will drop in the furrow opened by shovel or furrow opener 25. As the shovel or furrow opener 25 advances the earth will fall or be forced into the furrow on top of the fertilizer and cover the same. The shovels 25' and 25" will also assist in covering the fertilizer so that all the benefits thereof will be utilized. The boots or shoes 61 are each provided with a pair of lugs 62 and 63 which have connected thereto bars 64 and 65. Bar 64 is designed to be pivotally attached to frame 3 at 66 for communicating power from frame 66 to boots 61. Lug 63 is provided with a plurality of apertures 67 for permitting adjustment of bar 65 so as to allow boots 61 to be positioned at any desired angle. Bar 65 is pivotally connected at its forward end to a spring 68 which in turn is rigidly connected to bar 64 at 69. By this construction when the shovels strike any immovable object, as for instance, a stump, the boots may pivot on lug 62 which will, of course, cause a strain to be brought upon bar 65, but the same is designed to yield by a movement of spring 68. A transverse lifting bar 70 is rotatably mounted upon frame 3 and has secured thereto any desired number of members 71 which are rigidly secured to bar 70 in any desired way, as for instance, by set screws 72. The lifting members 71 are provided at their outer ends with apertures through which a lifting bar 73 passes. Lifting bar 73 is pivotally mounted at 74 to a draft bar 64 and is curved on an arc with the center at 66 so that the same may reciprocate in member 71. A suitable spring 75 is provided which presses against the lower side of member 71 and the upper side of bar 64 for holding shovel 25 to its work. The upper end of bar 73 is provided with apertures 76 that are designed to receive pins 77 so that when member 71 is raised it will press against pin 77 and consequently raise bar 73 together with bars 64 and boots 61. If it should be desirable to hold the shovels from entering too far into the earth bar 73 is adapted to be forced upward and pin 77 placed in one of the lower apertures 76. This will prevent the shovels from entering too far into the earth but will not prevent the shovels from moving upward as spring 75 will permit such movement if it should be necessary. Shaft 70 has rigidly secured thereto an arm 78 which has pivotally mounted therein a link or rod 79 which in turn is pivotally mounted at 80 to lever 81. As lever 81 is moved from one position to another of sector 82, members 71 are raised or lowered as the case may be.

In a fertilizer distributer of this kind, any desired number of boots 61 may be used, but for the purpose of illustration only three have been shown, one of which is designed to distribute the fertilizer and the other two to cover the fertilizer. The lever 81 will easily raise or lower boots 61 without the operator leaving the machine while lever 53 will disconnect or permit the connection of gear wheel 35 to wheel 1 and lever 27 will regulate the flow of fertilizer from the machine. All these levers are adapted to be operated by the driver without leaving the machine, and in any desired manner that he wishes to operate the same. By thus constructing a machine all the mechanism thereof that is desired to be adjusted or changed under various occasions may be so adjusted or changed without the driver leaving his place on the machine.

Having thus fully described my invention, what I claim as new and desire to secure by Letters Patent is:—

In a distributer of the class described, in combination, a hopper provided with a discharge opening, a fender arranged upon the floor of the hopper and having a wall extending in the arc of a circle, a wheel mounted for rotation within the hopper and provided on its periphery with a plurality of teeth curved in the direction of rotation of the wheel, said wheel rotating partly within the boundaries of the curved wall of the fender with its teeth passing above the discharge opening upon rotation of the wheel, the said curved wall of the fender being formed with a slot, and a weighted knocker consisting of a body portion having a curved shank extending from one end thereof, said shank being tapered from its junction with the body of the knocker, to its extremity, and having at said extremity, bent to form a hook, an eye member secured upon the floor of the hopper to the other side of the curved wall of the fender to that at which the wall is located, the said hooked end of the knocker shank being engaged with the said eye member with the shank extending through the slot in said curved wall of the fender and guarded by the vertical edges of said slot, the body of the knocker having its sides equally beveled, the under edge of the said body portion of the knocker being continued for a portion of its extent in a curve which is a continuation of the curve in which the shank of the knocker extends, the said under edge of the body of the knocker being continued for the remainder of its extent at an angle to the first mentioned portion.

In testimony whereof, I affix my signature in presence of two witnesses.

ROBERT G. WILSON.

Witnesses:
JOSEPH E. ALEXANDER,
JOHN T. BEUBOER.